Patented June 10, 1924.

1,497,146

UNITED STATES PATENT OFFICE.

FREDERICK KAYE, OF ASHTON-ON-MERSEY, ENGLAND.

VULCANIZATION OF RUBBER-LATEX PAPER.

No Drawing.      Application filed September 28, 1922. Serial No. 591,182.

*To all whom it may concern:*

Be it known that I, FREDERICK KAYE, a subject of the King of Great Britain and Ireland, residing at Ashton-on-Mersey, in the county of Chester, England, have invented new and useful Improvements in or Relating to the Vulcanization of Rubber-Latex Paper, of which the following is a specification.

This invention refers to and consists of an improvement in or modification of the invention forming the subject of my prior application for patent Serial No. 479,642, filed June 22nd, 1921. The object of the invention is the vulcanization of the rubber-latex paper in an improved manner.

By this invention the rubber-latex paper becomes gradually vulcanized during the process of manufacture, and after storage, so that the strength and other physical properties of the paper go on increasing up to a certain limit, with a varying duration of time according to the nature of the fibres, and other ingredients composing the paper, the amount of the rubber content, and the amount and nature of the vulcanizing material or agent.

According to the invention I add to the fresh latex, or to latex preserved with ammonia and the like, small quantities of soluble alkaline sulphides, such as ammonium sulphide, sodium sulphide, potassium sulphide, barium sulphide or calcium sulphide before the latex is diluted and added to the beaten pulp in the beater, the amount to be added being regulated by the rubber content of the latex and the calculated amount of sulphur required to bring about the desired state of vulcanization. The latex so treated is afterwards suitably diluted and added to the beaten pulp as set forth in my prior application No. 479,642. Afterwards suitable quantities of acids or of dissociable salts are added to neutralize the alkalinity of the latex, to throw out the rubber upon the beaten fibre, china clay etc., and decompose the alkaline sulphides to give in close association with the coagulated rubber the required quantities of colloidal sulphur.

As the web of paper containing rubber and colloidal sulphur is passed over the heated rollers in the process of drying the vulcanization of the rubber will be wholly or partially effected. The completeness of this vulcanization can be obtained by the addition to the beaten pulp before or after the addition of the latex, small quantities of accelerators, soluble in water, or of any accelerators which will adhere to, or may be precipitated on the beaten fibre and the rubber associated fibre. The term accelerator is applied to any organic or inorganic compound which increases the ease and speed with which the sulphur combines with the rubber.

An example of the amount of soluble sulphides to be used is as follows:—

If sodium sulphide is used as the vulcanizing agent or source of sulphur the amount required per gallon of latex which has a rubber content of 30%, will be 12 ozs. dissolved in water. This will give an amount of sulphur available equal to 10% of the weight of the rubber in the latex. Such an amount will be rarely needed as in most cases it will be found that 1% to 2% of sulphur calculated on the actual rubber content will be sufficient. That is to say 1.2 oz. to 2.4 ozs. of sodium sulphide. In like manner, any other soluble sulphide may be used in an amount calculated in molecular ratio to that for sodium sulphide.

With some fibres which may be slightly acid when put into the beater, as is the case with some samples of sulphide wood pulp and other sulphite pulps, no acid need be added as a coagulative agent. In other cases, where the paper is fairly strongly sized with resin and alum no acid need be added for coagulative purposes.

What I claim is:—

1. In the manufacture of paper, adding to the beaten pulp in a beating engine, rubber-containing latex, balata-containing latex or gutta-containing latex, to which has previously been added a small quantity of soluble alkaline sulphide, afterwards adding a coagulant to the latex-treated beaten pulp, and delivering the pulp to a paper making machine, wherein the excess of moisture is removed, and the paper finally dried by heated rolls, which simultaneously vulcanize the rubber in the paper, substantially as herein set forth.

2. In the manufacture of paper, adding to the beaten pulp in a beating engine rubber-containing latex, balata-containing latex or gutta-containing latex, to which has previously been added a small quantity of soluble alkaline sulphide, afterwards adding a coagulant to the latex-treated beaten pulp, along with an accelerator, and delivering the pulp to a paper making machine wherein the excess of moisture is removed, and the paper finally dried by heated rolls, which simultaneously vulcanize the rubber in the paper, substantially as herein set forth.

In testimony whereof I have signed my name to this specification.

FREDERICK KAYE.